Sept. 1, 1959 L. G. FORSTER 2,901,874
WRAPPING MACHINE FOR ARTICLES OR ASSEMBLIES OF ARTICLES
Filed Dec. 24, 1957 5 Sheets-Sheet 1
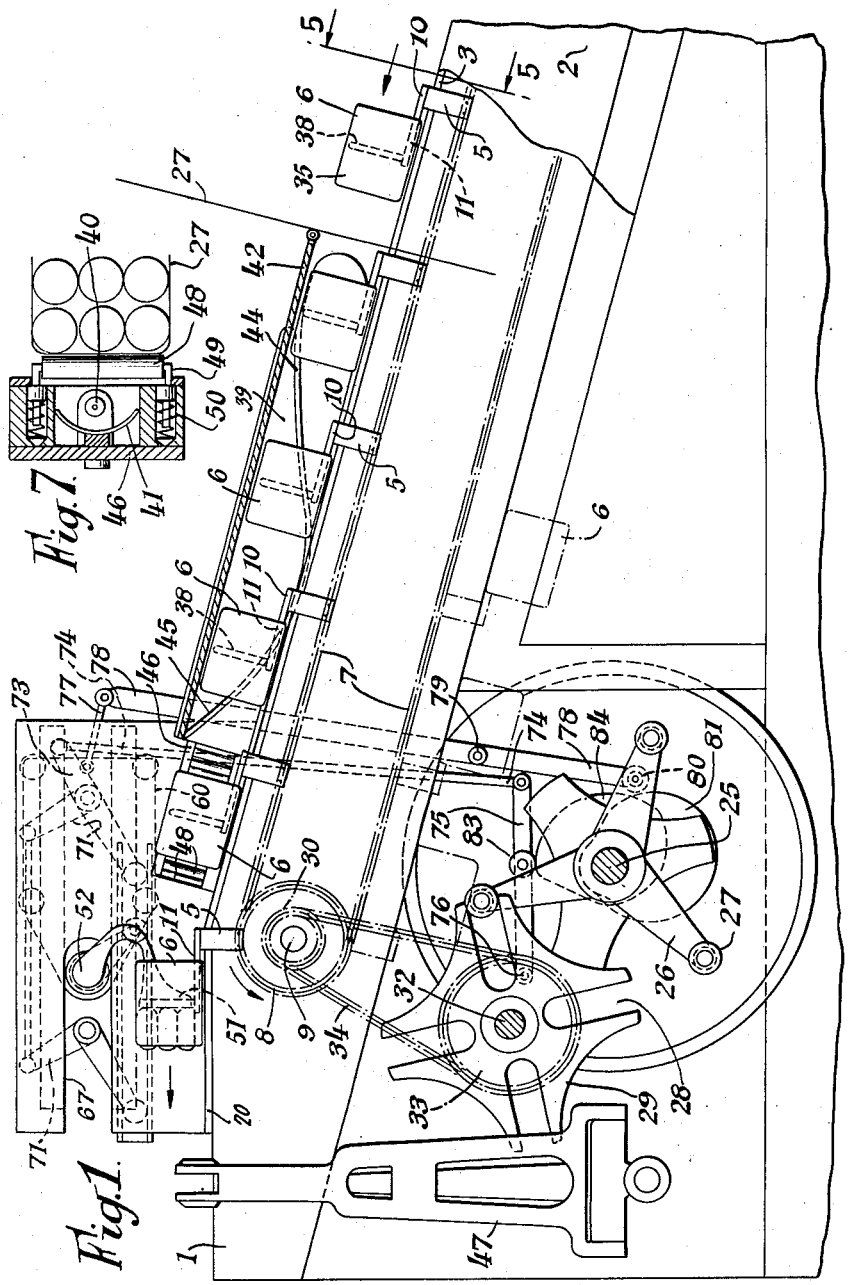
INVENTOR
LESLIE G. FORSTER
BY
ATTORNEY

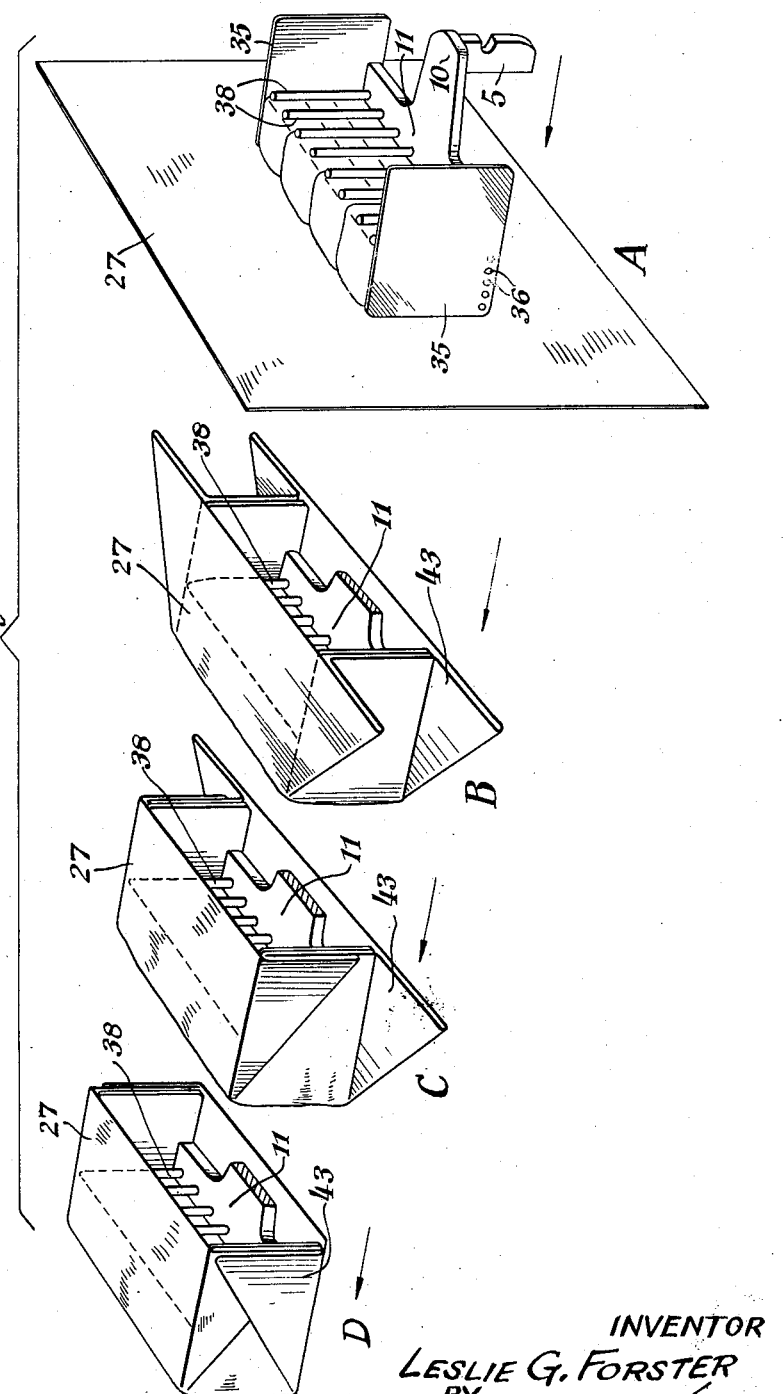

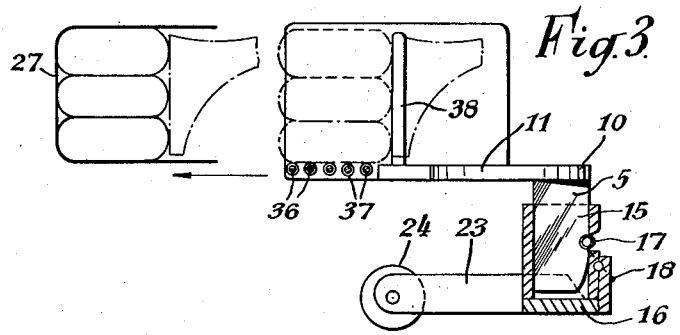
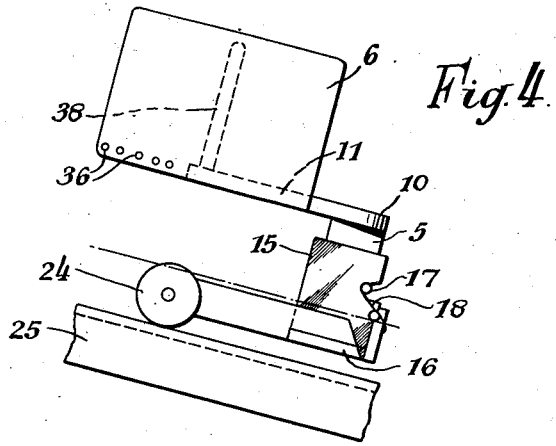
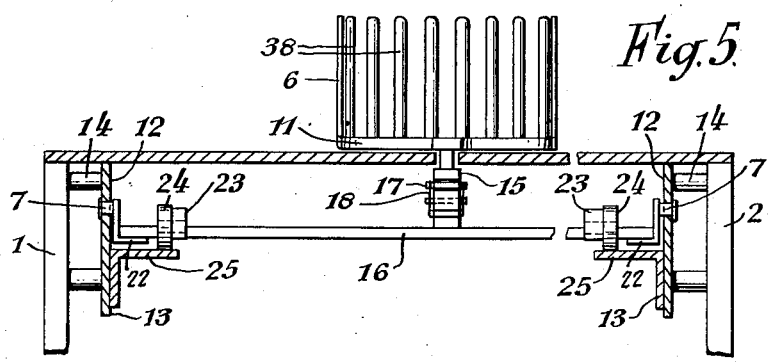

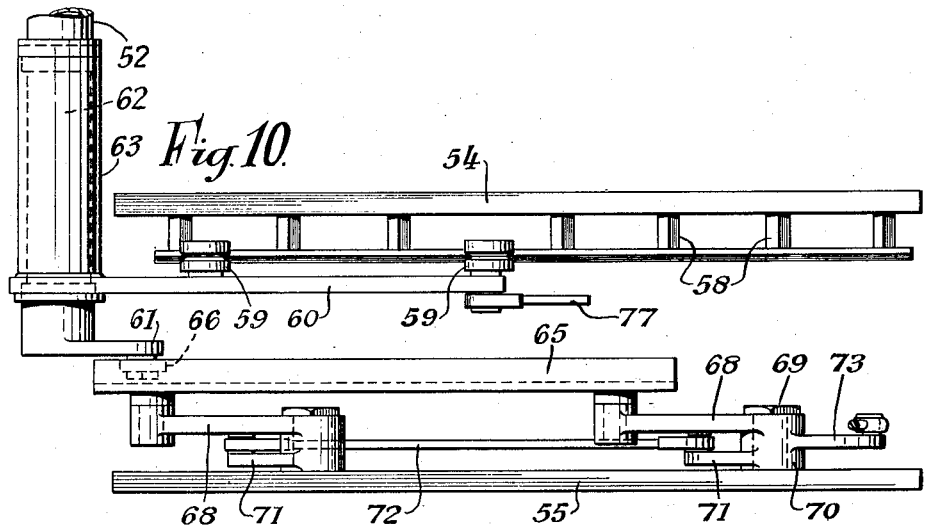
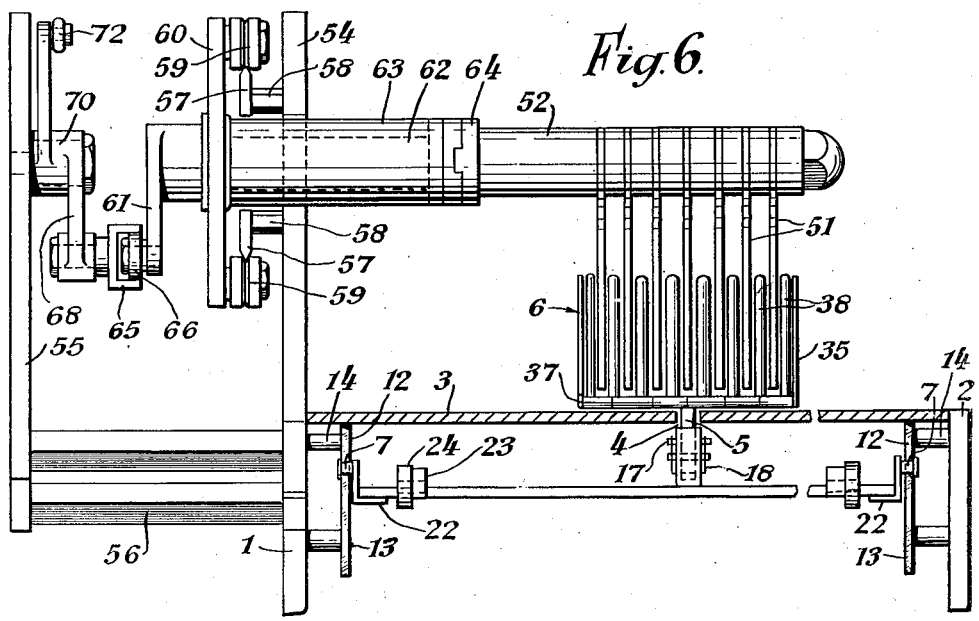

United States Patent Office 2,901,874
Patented Sept. 1, 1959

2,901,874

WRAPPING MACHINE FOR ARTICLES OR ASSEMBLIES OF ARTICLES

Leslie Gordon Forster, Greenford, England, assignor to Forsters Machine Company Limited, Hayes, England, a British company Application December 24, 1957, Serial No. 705,055

Claims priority, application Great Britain January 2, 1957

12 Claims. (Cl. 53—223)

This invention relates to the partial wrapping of articles or aggregation of articles automatically and is applicable primarily to articles which are readily deformable or do not maintain their shape such as sausages or Swiss rolls, to articles which are flaccid or yielding such as jellies, to groups of rigid articles such as biscuits and to loose assemblies of articles such as brussel sprouts or apples.

The invention utilises wrapping machines of the kind in which articles are moved upwardly along an inclined bed while pushing before them a piece of thin flexible wrapping material which is first folded backwardly after which the sides are folded downwardly and upwardly leaving the rear end open.

In the present method of wrapping, articles or aggregations of articles are placed or piled in the forward end of carriers movable along the bed of a wrapping machine and each carrier with its assembly of articles is covered over five sides by the wrapping material during upward movement along the bed of the machine, the rear end being left open and the partially wrapped packets are removed from the carrier after leaving the inclined bed by transfer mechanism which pushes them forwardly clear of the carrier.

More particularly in the present method of wrapping articles or aggregations of articles carriers having a forward open ended part containing the articles are moved intermittently upwardly along an inclined bed of a wrapping machine, the carriers being partially wrapped in thin covering material during said upward movement leaving the rear end open, the partially wrapped packet being then moved forwardly clear of the carrier by transfer members passing between openings in a transverse partition of the carrier dividing the carrier into forward and rearward parts.

The invention further comprises means for partially wrapping articles or aggregations of articles comprising: carriers having two side walls and a base and divided into two parts by a transverse partition having vertical openings therein; conveyor means for intermittently moving said carriers upwardly along an inclined bed of the machine; means for partially wrapping said carrier together with an article or articles placed in the forward part thereof during said upward movement leaving the rearward end open; and transfer mechanism consisting of members passing between said vertical openings in the transverse partition for moving said partially wrapped package forwardly away from the carrier.

The final closing of the open end of the partially wrapped packet may be effected in any suitable manner not forming part of the invention.

In the embodiments of the invention shown by way of example in the accompanying drawings:

Figure 1 shows a side view of the improved wrapping machine with some parts in section;

Figure 2 is a pictorial view showing the construction of the carriers and the sequence of operations;

Figure 3 shows a side view of a carrier with its supporting means dwelling at the end of its forward travel;

Figure 4 shows a side view of a carrier when on the lower part of the inclined bed;

Figure 5 shows a part transverse section along the line 5—5 in Figure 1;

Figure 6 shows an elevation of the transfer mechanism in its operative position as viewed from the delivery end of the machine;

Figure 7 shows a cross sectional view of the heater for the wrapping material;

Figure 10 shows a detached plan of the transfer mechanism.

Figure 8:
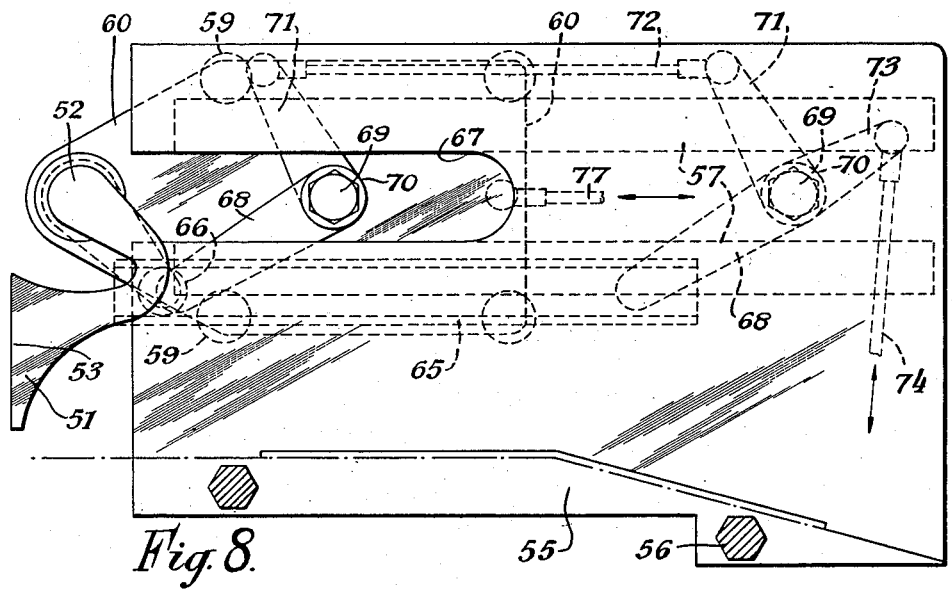
Figure 8 is a side elevation of transfer mechanism in an operative position.

Referring to the general arrangement shown in Figure 1 and to Figures 5 and 6, the main frame of the wrapping machine includes two substantial side plates 1, 2 with rigid cross connections, not shown. Beds 3, 20 are rigidly secured to the upper edges of the side plates and the bed 3 is formed with a narrow longitudinal slot 4 through which pass connections 5, in the form of a depending post between carriers or trays 6 above the bed 3 and a conveyor below the bed. The bed 3 is long and is inclined and bed 20 forms a short horizontal extension at the upper end. The side plates 1, 2 are supported by a substantial underframe 21.

A number of carriers are arranged at closely spaced intervals so as to be movable upwardly along the inclined bed 3. The carriers are moved intermittently by the conveyor which includes two endless chains 7 each supported from the inner side of each of the main frames 1, 2.

Each chain 7 which is preferably of long link type, runs over a driving sprocket 8 at its upper end and an idler sprocket or roller (not shown) at its lower end, the two driving sprockets being secured on a transverse shaft 9 mounted in bearings in the main frames 1, 2 and rotated intermittently.

The upper and lower runs of each of the chains are guided between fixed straight bars 12, 13 rigidly secured to but spaced from the inside of the main frames 1, 2 of the machine by distance pieces 14.

The post 5 depending from an extension 10 at the rear end of the base 11 of each carrier 6 passes through the narrow slot 4 in the inclined bed. The lower end of this post, shown also in Figures 3 and 4, engages in a correspondingly shaped opening in a larger vertical post 15 secured to a transverse bar 16 forming part of the conveyor mechanism. The inner and outer posts are secured together by a pin 17 which engages slots in both. This pin is pressed into the slots by a spring 18 which is carried by a second pin passing through the outer post. The two arms of the spring 18 are shaped to encircle the ends of the pins. Any device providing a similar readily detachable connection between the two posts may be used instead.

The outer post 15 is welded or otherwise rigidly secured to the flat transverse bar 16, the ends of which are connected to angle members 22 fastened to a link on the corresponding conveyor chain 7. To the upper part of each end of the bar 16 is welded or otherwise fixed an arm 23 which projects forwardly and carries at its end a pivotally mounted roller 24 running on the upper face of one flange of an angle bar 25, the other flange being bolted, welded or otherwise secured to one of the side rails 13 which guide the upper run of the chain 7.

The carriers 6 are in this way guided in a definite parallel path each with its base 11 spaced a short distance above the inclined bed 3 of the machine. The gap between the two is sufficient to allow entry of the wrapping material 27 throughout the folding processes which take place while each carrier with its contents is travelling upwardly from the position in which it engages the cut off length of material to the position in which it passes on to the horizontal bed 20 when the partially wrapped article is removed from the carrier.

The angle bars 25 terminate near the junction between the inclined bed 3 of the wrapping machine and the short horizontal bed 20 so that the rollers 24 run off the ends of the angle bars 25 before the conveyor chains 7 move the carriers 6 downwardly towards the return runs of the chains.

The carriers are thus moved in such a manner that they cannot readily tilt while on the inclined bed of the machine; but when each carrier in turn leaves the bed 3 and passes into and dwells in the final horizontal position on the short horizontal bed 20, it is supported in an overhung manner by its connection to the conveyor chains 7. Such support, since the carrier is then stationary, is adequate while the wrapper and the articles are being moved forwardly by transfer claws, the operation of which will be described hereinafter.

On completion of the transfer operation, the carrier moves downwardly and is returned along the lower run of the conveyor chains, an opening being provided in the short horizontal bed 20 to permit such downward movement.

The intermittent movement of the carriers is brought about through Geneva mechanism shown in Figure 1. The continuously rotating main driving shaft 25 of the machine carries one or more Geneva arms 26, each having at its end a roller 27, which engages in the usual manner with radial guides or slots 28 in a Geneva element 29 mounted on a transverse countershaft 32 carried by the main frame 1, 2. This shaft 32 also carries a chain sprocket 33 connected by a chain 34 to a sprocket 30 on the transverse spindle 9 carrying the driving sprockets 8 at the upper ends of the conveyor chains 7.

In the constructions shown, the three Geneva rollers 27 on the arms 26 and the four slots 28 of the Geneva wheel cooperate with the other mechanism to bring about a movement between the dwell periods, equal to the pitch of the carriers, that is, the distance between corresponding parts of adjacent carriers. The carriers thus dwell in the same positions between each movement.

Each of the carriers, Figures 2 to 6, consists of a sheet metal base 11 turned upwardly to form sides 35, or made separately and welded to the sides. The forward part of the base 11 is cut away and replaced by a number of transverse rods 36 each carrying several rollers 37 of small diameter as shown in Figure 3. These rollers may be of nylon, and are intended to support flexible articles without undue distortion. Such articles may consist for example of sausages, or of a plurality of articles, which will not slide easily over flat surfaces. The rollers are also essential to ensure ready removal of the articles from the carrier by means of transfer claws to be hereinafter described.

The upper edges of the sides 35 of each carrier are slightly tapered downwardly towards their leading ends to facilitate removal of the partially wrapped packet from the carrier during the transfer operation.

The carriers are each divided into a forward and a rearward part by a transverse row of vertical pins 38 preferably rounded and each secured rigidly to the base 11. The assemblies of articles to be wrapped are placed manually or by feeding apparatus in the forward part and are held by a component of the force of gravity against the pins 38. The value of such component in relation to the weight of the articles will depend upon the inclination of the inclined bed 3 to the horizontal. An inclination of about 15°, as shown, will in many cases be sufficient, but the bed may be inclined at a greater angle. An equivalent of the transverse row of vertical pins may be provided in other ways. For example, a pressed sheet metal partition with a plurality of vertical openings may be secured, as by welding, to the base and sides of the carrier.

The manner in which the wrapping processes are carried out while the carriers with their contents are moved up the inclined bed, are shown in Figures 1 and 2. The forward parts of the carriers 6, while dwelling or moving along the lower part of the inclined bed 3, are loaded by hand or otherwise with the articles to be wrapped or with assemblies of articles. Each carrier in turn dwells in such a position that covering material 27 may be fed downwardly in front of the carrier in a plane perpendicular to the inclined bed 3. A suitable length of material is fed downwardly in this way or is cut off from a strip which is fed downwardly from a drum. The feeding and the cutting off movements are synchronised with the movements of the carriers, all the movements being preferably derived from the same source of power. Such synchronism is intended to bring about cutting during the early part of the forward movement so as to ensure that the wrapping length is held by the moving carrier before it is finally severed. This stage of the operations is indicated at A in Figure 2.

The carrier, during the next movement upwardly along the bed 3 of the machine, pushes the cut off length of covering material 27 ahead and enters a tunnel formed by the bed, two side folding plates 39 and a top cover plate 42, shown in Figure 1, this mechanism being of known type. The side plates are arranged close to the carriers, but the gap between them is sufficient to allow free movement with the covering material passing between each side wall 35 of the carrier and the corresponding side plate 39. In this way the covering material is bent backwardly both above and below the carrier and is bent inwardly at the sides, this operation leaving extended doubled ears 43 at the upper and lower edges of the carrier at each side. This stage is shown at B in Figure 2.

Further movement upwardly of the carrier bends the upper ear 43 on each side downwardly by engagement with the known type of downwardly inclined slot 44 in the side plate 39. The result of this further movement is shown at C.

Further movement of the carriers upwardly along the bed 3 of the machine bends the lower ears 43 on each side upwardly by engagement with the second upwardly inclined slots 45 in the side plates 39. The lower turned up ear then overlaps the upper ear on each side as shown at D.

Still further movement allows each carrier to dwell between side heaters 46, Figures 1 and 7, forming extensions of the side plates 39 or mounted independently on the bed 3, thus sealing together the two ears and also sealing them to the covering material behind the ears.

The next movement brings the carrier with its contents and the enveloping wrapping material over the horizontal bed 20. The carrier with its contents is then contained in a bag of thin flexible material open at its rear end. The transfer claws then come into operation and move the partially wrapped packet forwardly clear of the carriers.

The final wrapping processes may be of any kind; for example the rearwardly extending part of the wrapping paper may be tucked inside laterally and folded downwardly and upwardly, the side tucking operation being effected for example by side levers 47 forming no part of the present invention. In accordance with another method the rearwardly extending wrapping material may be crimped and folded.

In a preferred form of heater, shown in Figures 1 and 7, each side of the packet makes contact with a series of rollers 48 each rotatable independently of the other rollers and mounted on a pin 49, the bent ends of the pin being guided transversely and urged into contact with the packets by light springs 50. The rollers receive heat from a heater element 40 in front of a reflector 41.

When each carrier first leaves the inclined bed 3 and dwells for a short interval on the horizontal bed 20, the articles are retained in the forward part of the carrier by the wrapping material which then also encloses the whole or the greater part of the carrier leaving only an opening at the rear end. During this dwell period the wrapper with the articles therein is moved forwardly clear of the carrier by the transfer mechanism now to be described.

Figure 9:
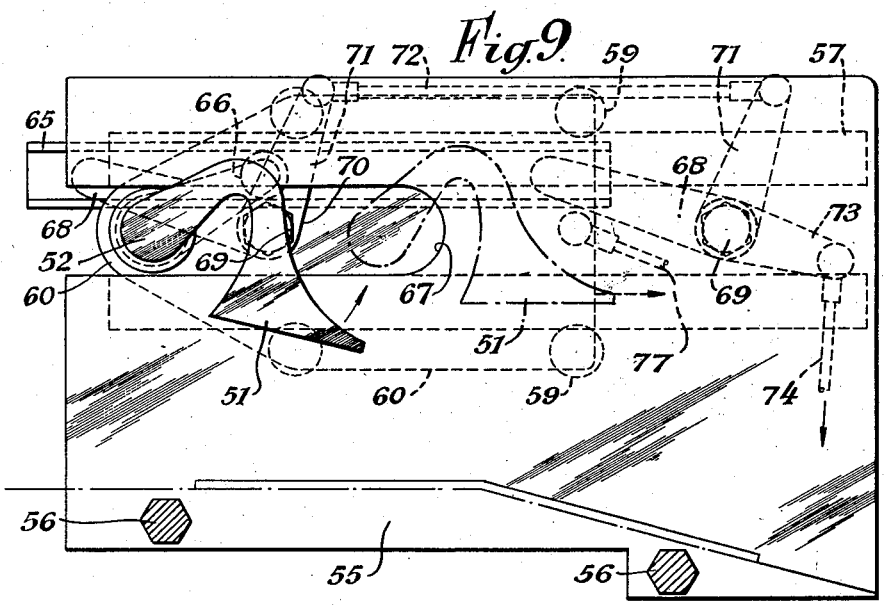
Figure 9 is a side elevation of the transfer mechanism when in an inoperative position.

The transfer member consists of a number of claws 51, Figures 6, 8 and 9, which are spaced along a tubular claw shaft 52 at such intervals that they can pass freely between the vertical pins 38 or their equivalent spaced transversely across each carrier 6. The front faces 53 of the claws extend over a sufficient depth vertically when in operation to ensure that soft articles can be removed without undue distortion. The rollers 37 forming the lower supports at the front part of the carrier facilitate this movement.

The claw shaft 52 can be rotated through an angle of at least 90° between the lower operative position, shown in Figure 8, and the upper rearmost inoperative position, shown in chain dot lines in Figure 9. The claws 51 are shown in full lines in Figure 9 during their upward withdrawal movement in an anti-clockwise direction. The shaft 52 is moved longitudinally of the bed 20 through a sufficient distance, when in its lowermost operative position, to ensure that the partly wrapped packet is moved entirely clear of the carrier 6 and into a suitable position for the carrying out of any final closing method which may be applied. The empty carrier is then free to move downwards during the next interval of forward travel of the conveyor chains. The claws 51 do not at any time make contact with the vertical pins or with any part of the carrier. The shaft 52 when in its upper inoperative position is moved rearwardly in readiness for the next transfer operation.

The transfer mechanism, shown also in Figure 10, is overhung on one side of the wrapping machine and is all supported from an upward extension 54 of the main side frame 1, or may form a separate unit bolted as a whole to a side frame. A second vertical plate 55 is rigidly supported from the main frame extension 54 by distance members 56. The means for traversing the mechanism lengthwise is mounted on the upward extension 54. Upper and lower guide plates 57 are supported rigidly from the frame extension 54 by distance pieces 58. The upper edge of the upper guide plate is of V-section and engages between ball races 59 rotatable about pins rigidly connected to the two upper corners of a plate 60. The lower V-shaped edge of the lower guide plate 57 similarly serves as a guide through similar ball races 59 mounted on two of the lower corners of the plate 60. In this way the plate is guided in a straight line longitudinally of the machine in a very precise manner without appreciable slack.

The plate 60 is extended forwardly and carries a tubular mounting 63 which forms a support for a rotatable assembly including a crank 61, a spindle 62 and the claw shaft 52. The spindle 62 is carried by means of ball bearings within the tubular mounting 63. The claw shaft 52 is rigidly connected to the spindle 62 by a transverse positioning and driving element 64 and securing studs or bolts. The boss of the crank 61 may be secured to the spindle 62 by a tapered key or by other means.

This mechanism thus makes provision for the movement longitudinally of the claws. Such movement in conjunction with the rotation of the claws at each end through an angle of at least 90° ensures that the claws themselves move approximately in a rectangular path. During the operative stroke the claws are moved forwardly while adjusted to their downward operative position as shown in Figure 8. On completion of this operative stroke, the claws are rotated to their uppermost position as shown in chain dots in Figure 9 and are moved rearwardly. At the end of the rearward stroke they are again moved downwardly behind the vertical pins 38 of the next following carrier 6.

The adjustment of the rotatable transverse assembly at the ends of its horizontal travel through an angle of at least 90° is brought about by engagement of the end of the crank arm 61 with a horizontal channel section guide member 65. A pin on the end of the arm carries a ball or roller bearing 66, the outer race of which engages the internal faces of the channel member 65. This channel member is adjusted between a lower position, shown in Figure 8 and an upper position, shown in chain dot lines 67 in Figure 9, by link work and levers including two arms 68, each mounted rotatably on a spindle 69 fixed to the second frame member 55. The bosses 70 of these arms 68 also carry arms 71, the free ends of which are connected by a link 72 so as to ensure that the guides 65 remain horizontal at all times. The rearmost boss 70 is further provided with an operating lever 73 connected by an approximately vertical link 74 to a second lever 75 pivoted at 76 to the main frame and carrying a follower 83 which engages a cam 84 carried by the main driving shaft 25 of the machine. This operating mechanism is also shown in Figure 1.

The longitudinally adjustable plate 60 is connected by a link 77 to the upper end of a lever 78 pivoted to the main frame at an intermediate point 79, the lower end of this lever carrying a follower 80 which engages a second cam 81 also mounted on the main driving shaft 25.

In this way the horizontal and vertical movements of the claws are carried out in synchronism to ensure rapid removal of the partially wrapped articles from the carriers, the speed of this operation being such as to avoid undue distortion of the articles. When the machine completes a run of articles of a particular size, the carriers may be readily removed and replaced by a set of carriers of different dimensions. The claw assembly including the claws 51, the tubular shaft 52 and the driving element 64, is also removed and replaced by another assembly of the required dimensions, thus ensuring rapid interchangeability from one size of packet to another.

The arrangement shown by which the articles are first moved up an inclined plane and the leading article then moves on to a horizontal plane facilitates the very close spacing of the carriers on the conveyor chains, since the increase of the gap between the first two carriers when this stage is reached, increases the space available for the movement of the claws downwardly into their operative position with the vertical ends of the claws ready for engagement with the rear side of the partly wrapped assembly of articles in the leading carrier.

I claim:

1. Means for partially wrapping articles or aggregations of articles comprising: carriers having two side walls and a base and divided into two parts by a transverse partition having vertical openings therein; conveyor means for intermittently moving said carriers upwardly along an inclined bed of the machine; means for partially wrapping said carrier, together with an article or articles placed in the forward part thereof, during said upward movement leaving the rearward end open; and transfer mechanism including members passing through said vertical openings in the transverse partition for moving said partially wrapped package forwardly away from the carrier.

2. Wrapping means as claimed in claim 1, in which each carrier is supported at its rear end by a readily detachable connection to an endless chain conveyor, below the bed of the machine.

3. Wrapping means as claimed in claim 2, in which the conveyor is intermittently operated by means of Geneva mechanism actuated from a continuously running main operating shaft of the wrapping machine.

4. Wrapping means as claimed in claim 1, in which the conveyor comprises two endless chains spaced apart laterally and guided along at least their upper run, corresponding links in each chain being connected by a transverse rod, means supported by the centre of each rod for supporting the rear end of a carrier, said means passing upwardly through a longitudinal slot in the bed of the machine.

5. Wrapping means as claimed in claim 4, in which the forward end of the carrier is further supported, so as to hold it clear of the bed, by leading rollers carried by forward extensions of said transverse rod running over fixed guides adjacent the side frames of the machine.

6. Wrapping means as claimed in claim 1, in which the transfer mechanism includes claws reciprocated in a longitudinal direction and moved between upper and lower positions so that the claws move forwardly when operating and in the lower position and rearwardly during withdrawal when in the upper position.

7. Wrapping means as claimed in claim 6, in which the claws are carried by a claw carrying shaft supported from one side of the machine and extending transversely across and above the path of the carriers.

8. Wrapping means as claimed in claim 7, in which the claw carrying shaft is mounted so as to reciprocate horizontally forwardly and rearwardly and is actuated by link mechanism from a cam on the main driving shaft of the machine.

9. Wrapping means as claimed in claim 8, in which the claw carrying shaft is rotated to move the claws between raised and lowered positions by a second cam also mounted on the main driving shaft.

10. Wrapping means as claimed in claim 9, in which the said claw carrying shaft causes the claws to move between raised and lowered position by an arm, the end of which carries a roller running in a longitudinal channel in a member which may be moved between raised or lowered positions by the said second cam.

11. Wrapping means as claimed in claim 7, in which the claws each terminate in a straight edge which is vertical when in the lowermost operative adjustment so as to engage the articles during the forward movement.

12. Apparatus for partially wrapping articles comprising a carrier including two side walls at opposite ends of a base and a transverse partition on said base and having at least one opening therethrough, conveyor means for moving said carrier along a bed of the machine, means for partially wrapping said carrier together with an article thereon during movement along said conveyor means leaving the rearward end open, and transfer means including means passing through said opening in the transverse partition for engaging said article and moving said partially wrapped package forwardly away from the carrier.

References Cited in the file of this patent
UNITED STATES PATENTS

| | | |
|---|---|---|
| 1,116,406 | Fleischer | Nov. 10, 1914 |
| 2,570,030 | Forster | Oct. 2, 1951 |
| 2,774,205 | Forster | Dec. 18, 1956 |